July 29, 1969  E. F. HINDERER ET AL  3,457,775
CIRCUITRY FOR LEAK TESTER

Filed Sept. 13, 1967  2 Sheets-Sheet 1

INVENTORS
EDWARD HINDERER
CHARLES F. DALLIER
BY Curtis, Morris + Safford
ATTORNEYS INVENTORS
EDWARD HINDERER
CHARLES F. DALLIER
BY
Curtis, Morris & Safford
ATTORNEYS United States Patent Office 3,457,775
Patented July 29, 1969

3,457,775
CIRCUITRY FOR LEAK TESTER
Edward F. Hinderer, Royal Oak, and Charles F. Dallier, Farmington, Mich., assignors to Ajem Laboratories Inc., Livonia, Mich.
Filed Sept. 13, 1967, Ser. No. 667,443
Int. Cl. G01m 3/04; G08b 21/00, 29/00
U.S. Cl. 73—40                                        10 Claims

ABSTRACT OF THE DISCLOSURE

A leak testing system having an electronic control circuit which biases semiconductors in responsive branch circuits to prevent simultaneous indication of a leak and no-leak condition, prevent initiation of a second test cycle until previous test cycle has been completed and disconnect meter for visually indicating a leak or no-leak until conditions are stabilized.

---

The present invention relates to leak testing and more particularly to improvements in a leak testing system of the kind described and claimed in the United States Letters Patent of Richard Thomas Fitzpatrick et al., No. 3,326,034, issued June 20, 1967, and entitled Leak Testing Apparatus.

The leak testing system of the Fitzpatrick et al. patent comprises a transducer for producing an electric current proportional to the size of a leak in a part to be tested and an electric circuit having responsive elements for indicating a large leak, a small leak and a no-leak condition. Operation of the testing system is automatically controlled by the circuit which actuates instrumentalities to fill, stabilize and test a part in a particular sequence and regulates the time period of said steps by RC networks and solid state semiconductors.

Such an electronic leak testing system constitutes a considerable improvement in the art over previously known leak testing systems in that it has been found to be more sensitive and responsive and avoids the use of mechanical switches. However, it has been found that occasionally stray currents picked up by the extremely sensitive circuit may trigger unintentional operation of a branch circuit and give a false indication of a particular condition. Thus, it is possible while the testing system correctly indicates a small leak, to have a branch circuit energized by stray currents to simultaneously indicate a no-leak condition. Also, it has been found that if the starting switch is accidentally actuated before a particular leak test is terminated, a plurality of testing operations may be in progress at the same time and produce results that are not a true indication of a particular condition. Furthermore, operators many times wish to observe the result of a leak test visually by use of a meter, but if the meter is continually connected in the circuit, it is apt to operate erratically due to changes in conditions before the test is actually made.

One of the objects of the present invention is to provide an improved leak testing system of the type indicated which avoids multiple signals, provides greater circuit stability, and is more reliable in operation.

Another object of the invention is to provide a circuit arrangement of the type indicated which prevents the system from recycling until a leak testing operation in progress has been completed.

Another object of the present invention is to provide an arrangement in which a meter for visually observing a leak test is only operative while a testing step is being performed.

Still another object is to provide an improved leak testing system which is of simple and compact construction, economical to manufacture and one which is reliable in operation.

These and other objects will become more apparent from the following description and drawings in which like reference characters denote like parts throughout the several views. It is to be expressly understood, however, that the drawings and the description of the particular disclosure therein are for the purpose of illustrating and describing one particular apparatus and arrangement of parts incorporating the invention only and are not a definition of the limits of the invention, reference being had for this purpose to the appended claims.

Figure 1:
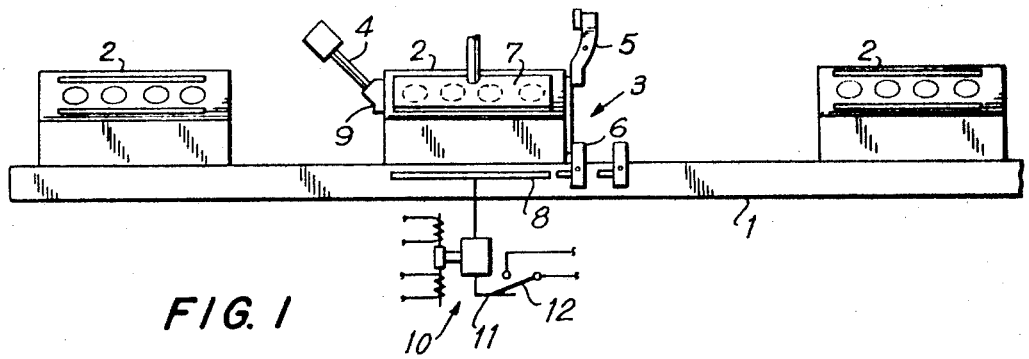
FIG. 1 is a diagrammatic view of a production line conveyor at a testing station and showing the manner of clamping the parts in a position and sealing the cavitites therein for testing and the control switch for initiating a testing operation.

Referring now to the drawings, the improvements constituting the subject matter of the present invention are shown applied to a leak testing system like that described and claimed in the Fitzpatrick Patent No. 3,326,034, referred to above. FIGURE 1 illustrates a conveyor 1 for intermittently advancing parts 2 to a station 3 where the parts are to be tested for leaks. In the illustrated embodiment the parts 2 are shown in the form of automobile engine blocks having internal cavities in the form of cylinders and valve ports, but it will be understood that the system can be used to leak test parts of other shapes and sizes. At station 3 the engine block 2 is stopped by a ram 4 which engages its front end and clamps the block against dogs 5 and 6 at its rearward end. Closures 7 and 8 are then operated to cover and seal openings, such as the valve ports and crank case opening in the block, and the ram 4 has a seal 9 which also closes the opening in the front end of the block for a water pump (not shown). Closure 8 is shown diagrammatically as operated by an electromagnetic actuator 10 having an extension 11 which operates a switch 12 to initiate a testing operation. While not shown, it will be understood that ram 4 and closures 7 and 8 are operated automatically in sequential order and that the closure 8 will be the last to be actuated so that all the openings will be closed and sealed before switch 12 is closed to initiate a test.

Figure 2:
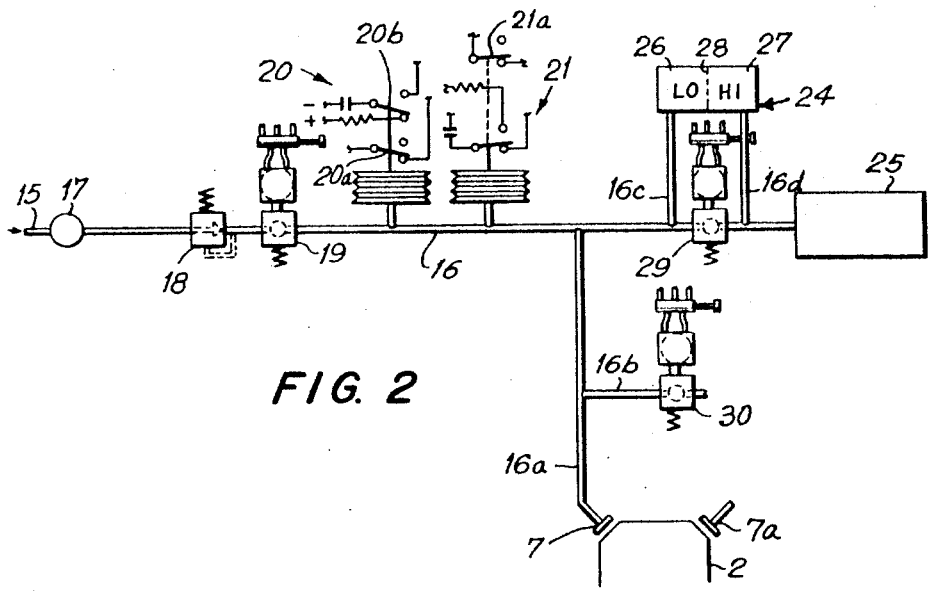
FIG. 2 is a diagrammatic view of a pneumatic testing system showing the manner of connecting a closed chamber associated with the wall of a part to be tested for a comparison with a trapped sample to indicate a difference in pressure when a leak occurs.

The testing apparatus is illustrated diagrammatically in FIGURE 2 as comprising a fluid pressure system having a source of fluid 15 at high pressure, for example, air at 120 pounds per square inch. Fluid from said source 15 flows through a filter 17, a pressure regulator 18 for reducing the pressure from 120 pounds per square inch and a normally closed rapid-fill valve 19 to a conduit 16. Pressure operated switches 20 and 21 are connected to conduit 16 which are shown separately in FIGURES 2 and 4 for purposes of description, but it will be understood that they may be combined in a single unit. Switch 20, referred to herein as the high pressure switch, is a double pole type having one normally closed contact 20a which opens at 35 pounds per square inch and one normally open contact 20b which closes when a pressure of, for example, 45 pounds per square inch occurs in the conduit 16. Low pressure switch 21 is normally open above 35 pounds per square inch and closed at 35 pounds per square inch and below.

A measuring instrument 24 is connected to the conduit 16 beyond the low pressure switch 21 by lines 16c and 16d and the end of the conduit terminates in a ballast tank 25. The measuring instrument 24 has separate cells or chambers 26 and 27 with a diaphragm 28 therebetween and the separate chambers are connected to the conduit 16 through the lines 16c and 16d. A branch 16a from the conduit 16 is connected to one of the closures 7 to supply air under pressure to the cavity in the engine block 2 and the opposite side of the engine block is sealed by a closure 7a. Conduit 16 and branch 16a are vented to the atmosphere through a branch 16b. A normally open divide valve 29 is provided in the conduit 16 between the branches 16c and 16d connecting the conduit 16 to the separate chambers 26 and 27 of the measuring instrument 24. Divide valve 29 when closed isolates the ballast chamber 25 and chamber 27 of the measuring instrument from the remainder of the testing circuit including the other chamber 26 of the measuring instrument and part to be tested. A normally open dump valve 30 is provided in the branch line 16b for venting the conduit 16 to the atmosphere. Thus, only the valves 19, 29 and 30 are required to perform a testing operation.

To perform a leak test, the dump valve 30 is closed and the fill valve 19 is opened to supply air at 45 pounds per square inch through the conduit 16 and branch 16a to the cavity in the engine block 2. The air simultaneously flows into the ballast chamber 25 and chambers 26 and 27 of the measuring instrument 24. If a pressure of 35 pounds per square inch does not occur within a predetermined period of time, due to a large leak in the part, the contact 20a of the high pressure switch 20 does not open, which immediately terminates the test. When a pressure of 45 pounds per square inch does occur in conduit 16, the contact 20a does open and contact 20b of the high pressure switch 20 closes and operating through a control circuit, later to be described, initiates the next step in the testing operation by closing the rapid-fill valve 19 and opening the dump valve 30. Dump valve 30 then bleeds testing fluid from the chambers 26 and 27 of the measuring instrument 24 and part 2 to be tested until a low pressure of 35 pounds per square inch occurs in the conduit 16 and closes the low pressure switch 21. Switch 21 operates through the control circuit to again close dump valve 30 and to trap the air at that pressure in the interior of the part to be tested for a period of time, as measured electronically, to permit the pressure to stabilize. The divide valve 29 is then closed to isolate the ballast tank 25 and chamber 27 of the differential pressure measuring instrument 24 from the chamber 26 and cavity in the part 2 being tested. The divide valve 29 is maintained closed for a predetermined period of time as measured electronically, for example, five seconds, during which time any leak in the engine block 2 will produce a difference in pressure in the chambers 26 and 27 of the measuring instrument 24 and a movement of the diaphragm 28 to the left as viewed in FIGURE 2.

It will be understood that the conduits 16 and ballast chamber 25 are formed as cavities in a metal manifold block, the measuring instrument 24 is connected to the block, and the valves 19, 29 and 30 extend through the block in alignment with passages therein the same as described and claimed in the Fitzpatrick Patent 3,326,034, referred to above. As the manifold block and valves form no part of the present invention, they have not been illustrated or described, but are intended to be incorporated by reference to the Fitzpatrick patent.

Figure 3:
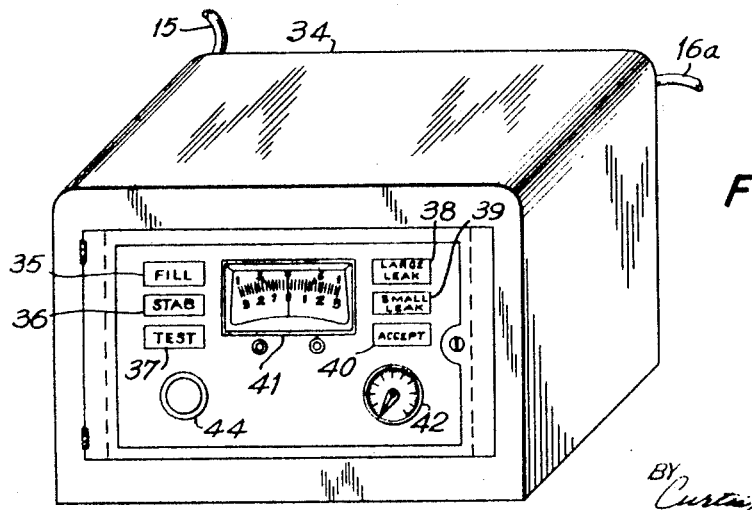
FIG. 3 is a perspective view of a cabinet in which the entire testing apparatus is incorporated.

The testing apparatus of the present invention provides an extremely compact arrangement having a minimum number of elements which are all mounted in a cabinet 34, as shown in FIGURE 3. This cabinet 34 is portable and placed closely adjacent the station 3 of the conveyor, see FIGURE 1, where the parts are to be tested. A fluid supply line 15, see FIGURE 2, leads into the cabinet 34 to supply fluid thereto at 125 pounds per square inch and the branch line 16a leads from the cabinet to the closure 7 for closing the parts to be tested. All of the other parts of the testing apparatus are located in the cabinet 34 to reduce the length of the connecting line therebetween to a minimum, and especially the lines 16c and 16d between the measuring instrument 24 and the ballast tank 25. Due to the short lengths of the connecting lines between the elements, less time is required to stabilize the pressure throughout the testing system and a more accurate measurement may be made of any differences resulting from a leak in the part being tested.

As shown in FIGURE 3, the front of the cabinet has three window openings 35, 36 and 37 at the left hand side for indicating the particular steps as the testing operation proceeds, such as "fill" and "stabilize" and "test" and one of the three signs is illuminated during the test to indicate the progress of a test. At the right hand side of the cabinet 34 there are three other window openings 38, 39 and 40 with signs therein indicating a "large leak" or a "small leak" or "accept" and one of the three signs will be illuminated after a test to indicate one of the three conditions. Between the window openings in the center of the cabinet 34 is a meter 41 for indicating a difference in pressure and the amount of pressure difference resulting from a leak. A knob 42 of a controller 43, later to be explained in more detail, is provided for adjusting the pressure difference which the measuring instrument senses to indicate a leak. Another knob 44, which actually represents a plurality of knobs, is provided for adjusting the resistance of the RC networks of timing branch circuits and thereby adjusts the period of time for a particular step of the method.

Figure 4:
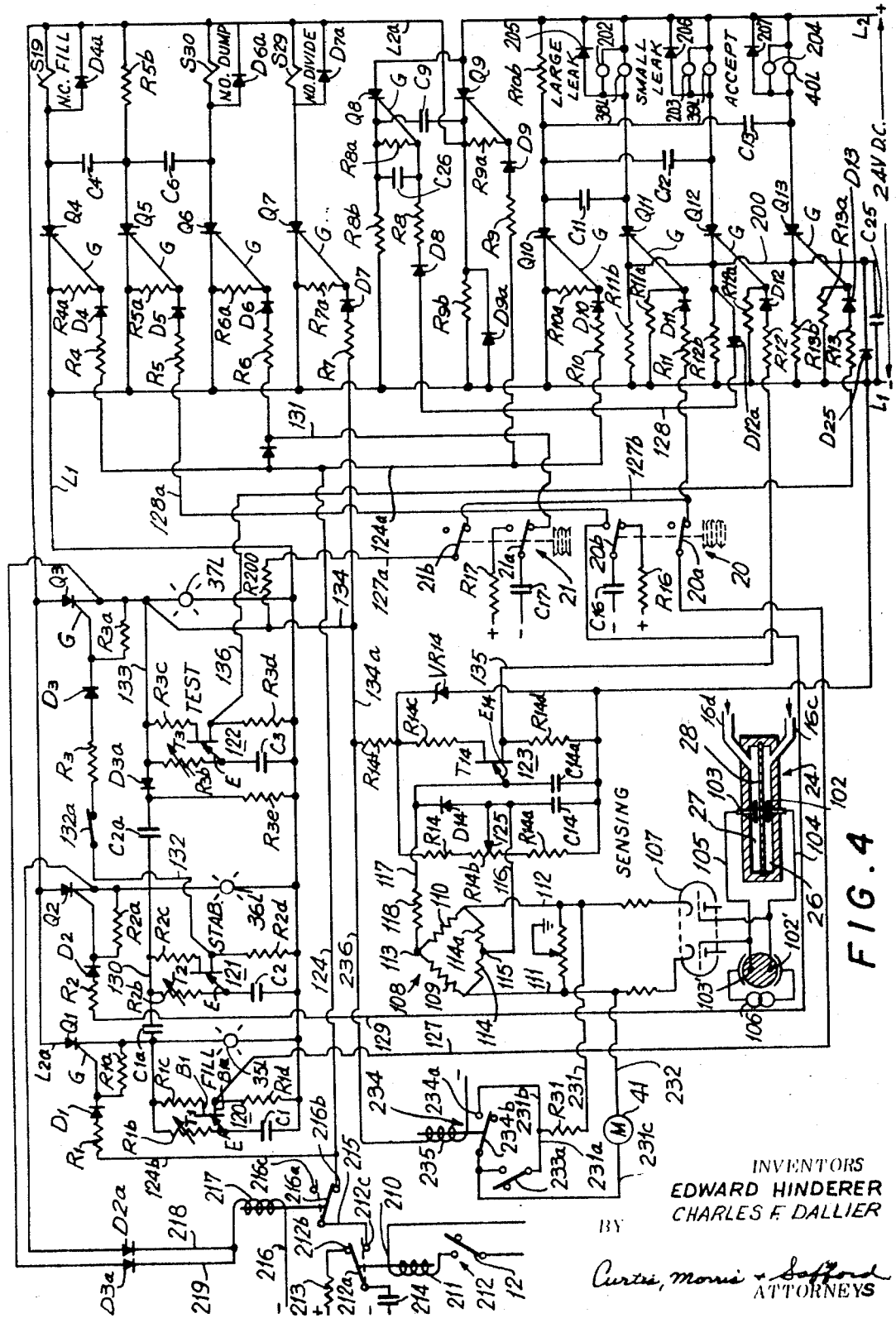
FIG. 4 is a diagrammatic view of the electronic testing system for diagrammatically performing the steps of a test and indicating the results of the test.

FIGURE 4 diagrammatically illustrates the electric circuit and includes a more detailed illustration of the measuring instrument 24 comprising the chambers 26 and 27 at opposite sides of the diaphragm 28. Electrode plates 102 and 103 are mounted on stems n the siide walls of the opposed chambers 26 and 27 and are connected by electric lines 104 and 105 to corresponding electrodes 102' and 103' in an enclosing envelope containing a noble gas. An oscillating generator 106 producing a 50,000 cycle alternating current is arranged to ionize the gas between the electrode plates 102' and 103'. When the diaphragm 28 is centrally positioned between the plates 102 and 103 the electrode plates 102' and 103' are equally charged. However, as the diaphragm 28 moves to the left in FIGURE 2 due to a leak in the part 2 to be tested, the plate 102' becomes more highly charged than plate 103'. This difference in charge on the electrodes 102 'and 103' produces a direct current voltage which is directly proportional to the degree of displacement of the diaphragm 28 which, in turn, is directly proportional to the difference in pressure in the chambers 26 and 27. Thus, the measuring instrument 24 constitutes a transducer which converts mechanical movement to an electrical potential. The change in potential, due to deflection of the diaphragm 28, is converted into a current flow by the cathode follower 107 which, in turn, is connected to an electric bridge 108. The bridge 108 has resistances 109 and 110 connected to opposite sides of the output lines 111 and 112 of the cathode follower 107 which are connected to each other at the junction 113, and resistances 114 and 114a connected across the line in parallel with 109 and 110 and connected to each other at their juncture 115. Thus, any transient voltage generated by the transducer will be transmitted from the bridge through lines 116 and 117. This difference in voltage is used to automatically indicate a leak in the part being tested. A meter 41 also is connected across the lines 111 and 112 and will visually indicate a pressure difference resulting from a leak.

The electric circuit automatically indicates and controls the performance of the steps of an entire testing operation. The steps of a testing operation are performed in a predetermined timed sequence and all mechanical switches except the pressure operated switches 20 and 21 are eliminated to increase the speed with which the testing steps are performed and to increase the reliability of the system. The control elements are all of the solid state type comprising semiconductors which resist the flow of current until energized by an electric pulse or at a particular voltage level, and then "fire" to permit current flow until a pulse is imposed which resists current flow and shuts off the flow of current. The semiconductor current control devices used in the control circuit include silicon controlled rectifiers which are fired at a predetermined threshold voltage, and continue to conduct after once started, and unijunction transistors which are much more controllable at an impressed starting and stopping voltage at which they conduct and shut off current flow. The control elements also include silicon diodes which permit flow of electric current in one direction only to protect the rectifiers and transistors.

The circuit, in general, comprises a plurality of branches connected in parallel between lines L1 and L2 of a DC source as, for example, 24 volt. Certain of the branch circuits comprise a plurality of timing RC networks 120, 121 and 122 corresponding to the filling, stabilizing and testing steps, each of which requires a predetermined period of time; current responsive branches for actuating instrumentalities, such as valves 19, 29 and 30 required for performing the testing steps; current responsive branches for indicating the various steps of the testing operation; current responsive branches for indicating the results of the test; and the interconnections between the various branches to energize the timing and current responsive branches in the proper timed sequence and for indicating the various steps of the testing operation and results of the leak test.

The timing branches 120, 121 and 122 for controlling the time period for filling, stabilizing and testing, respectively, are identical so that a description of the one for controlling the filling operation, and indicated by the suffix 1, will suffice for the others. The RC network for the timing branch 1, for example, includes a variable resistor R1b and a capacitor C1. The variable resistor R1b is adjustable by turning knob 44, see FIGURE 3, to vary the time period for filling between, for example, 1 and 5 seconds. The resistor R1b and capacitor C1 are connected in series across the 24 volt line and the emitter E of a unijunction transistor T1 is connected between the resistor and capacitor. Balancing resistors R1c and R1d are connected between the bases B1 and B1a of transistor T1 and opposite sides of the line. The elements of the timing branches 121 and 122 are indicated by the same reference characters as the timing branch 120 with suffixes 2 and 3, respectively. Each of these timing branches takes a predetermined period of time to charge the capacitor to the potential at which transistor conducts current.

A current responsive indicating device such as an electric lamp 35L, 36L, 37L is connected in parallel with each timing branch 120, 121 and 122, respectively, for illuminating the signs indicating the fill, stabilize and test steps.

All of the other current responsive devices are connected in parallel branches, generally designated 4 to 13, between the lines L1 and L2, and these branches include control as well as current responsive devices. For example, the solenoid coils for operating the fill valve 19, divide valve 29 and dump valve 30 are connected in branch circuits Nos. 4, 7 and 6, respectively, and are indicated by reference characters S19, S29 and S30. Also electric current lamps 38L, 39L and 40L for indicating the result of a test are shown connected in branch circuits 11, 12 and 13. Thus, when any of the lamps 38L, 39L or 40L is energized it will illuminate the sign in corresponding window 38, 39 or 40 in the cabinet 34, see FIGURE 3, to show a large leak, a small leak or an accept signal.

A leak sensing circuit branch 123 responsive to variations in the electrical output from the measuring instrument 24 and bridge circuit 108 is connected between the branch 122 for timing a test period and the current responsive branch 12 including the indicator lamp 39L for indicating a small leak. The sensing circuit comprises a unijunction transistor T14 having an emitter E14 connected to the junction 115 from the bridge circuit 108 through a line including a directional diode D14 between lines 116 and 117 and a tap contact 125. A capacitor C14 also is connected in said line in series with the diode D14. One end of the line is connected to output line 117 from generator 106 at the junction 113 of the bridge 108 and including a resistor 118, an intermediate point in the line beyond tap contact 125 is connected to the other output line 116 from the bridge and the opposite end of the line is connected to line L1. Output line 117 also is connected to a second capacitor C14a in parallel with capacitor C14 and between diode D14 and capacitor C14a the line is connected to the emitter E14 of the transistor T14. Transistor T14 has a circuit including balancing resistors R14 and R14a and a variable resistor R14b therebetween and connected between branch circuit 3 and line L1. Tap contact 125 engages resistance R14b, which in effect constitutes a potentiometer, and the tap contact 125 is adjusted by a knob 42 as previously described, see FIGURE 3, to initially adjust the size of the leak which can be detected. Resistors R14c and R14d are connected between the bases of the transistor T14 and output from branch 3 and line L1 in parallel with resistors R14 and R14a. Also in parallel with the resistors and across the line including the transistor T14 is a voltage regulator VR14 to maintain a constant voltage difference applied to the opposite bases of the transistor. A resistor R14f is connected between transistor circuit and the branch circuit 3.

The circuit will now be described by the functions it performs so that in addition to describing the circuit the mode of operation of the testing apparatus also will be described. When a part 2, such as an engine block, engine head, manifold or any other part having a cavity, see FIGURE 1, is to be tested for leaks, it is brought into place at the station 3 and sealed and the movement of closure 3 actuates the start switch 12 to initiate operation of the leak testing apparatus. Start switch 12, later to be explained more in detail, produces an electric pulse which is directed through lines 124 and 124a to resistor R10 and diode D10 of branch circuit 10 to the gate G of silicon controlled rectifier Q10 therein. Pulsing of rectifier Q10 causes it to fire and produce current flow from line L2 to L1 through the branch 10 including resistor R10b. Branch 10 also includes a resistor R10a to protect the rectifier from excessive current flow. Current flow through branch 10 charges capacitors C11, C12 and C13 which puts a bias on the silicon controlled rectifiers Q11, Q12 and Q13 in branches 11, 12 and 13 sufficient to shut off any current flow therein. Thus, all lamps 38L, 39L and 40L in the branches 11, 12 and 13 will be extinguished.

Simultaneously, a pulse will be directed from line 124a to gate G of silicon controlled rectifier Q9. When rectifier Q9 fires, current will flow through branch 9 including resistor R9b and a diode D9a to connect line L2 to its extension L2a. Thus, one end of all of the branches 1 to 7 will be supplied current from line L2. Branch 9 also includes resistance R9a.

Also, the pulse from line 124a will be directed to the gates G of silicon controlled rectifiers Q4 and Q6 in branches 4 and 6 having resistors and diodes the same as in branch 9. Firing of rectifiers Q4 and Q6 produces a current flow through the branches 4 and 6 including the solenoid windings S19 and S30 for operating the fill valve 19 to open position and the dump valve 30 to closed position, see FIGURE 2.

Lastly, the actuation of switch 12 directs a pulse through line 124b to the gate G of the silicon controlled rectifier Q1 through resistor R1 and the isolating diode D1. Firing of rectifier Q1 produces a current flow through the electric lamp 35L to indicate that a filling step is being performed. Branch 1 has a resistor R1a to protect the rectifier Q1, the same as branches 4, 6 and 11 to 13. The firing of the rectifier Q1 also energizes the RC network of timing branch 120.

With the fill valve 19 and divide valve 29 open and dump valve 30 closed, air under pressure flows through the conduit 16 and 16a, see FIGURE 2, to fill the chambers 26 and 27 of the measuring instrument 24, ballast tank 25 and cavity in the part 2 being tested. If the part 2 being tested has a large leak which prevents an increase in pressure in the conduit 16 within, for example, 5 seconds, transistor T1 of the first timing device 120 fires and transmits a pulse through the line conductor 127 and contact 20a of the pressure responsive switch 20 and then through the resistor R11 and diode D11 to the gate G of a silicon controlled rectifier Q11 in the branch circuit including the electric lamp 38L. This branch circuit 11, like the others, has resistances R11a and resistance R11b. Firing of rectifier Q11 causes current flow through the electric lamp 38L to illuminate the sign indicating a "large leak" in the part being tested. Current in branch 11 also flows through a conductor 128, in a manner later to be described in detail, to gate G of a silicon controlled rectifier Q8 in branch 8. This branch includes a resistance R8a and R8b and is connected through capacitor C9 to the branch 9 circuit including the rectifier Q9. Current flow through the branch 8 produces a bias in the branch 9 sufficient to shut off the flow of current through the latter. Such interruption in the current flow from the line L2 to its extension L2a opens the branches 1 to 7 including the solenoid windings S19 and S30. Deenergization of solenoids S19 and S30 closes the fill valve 19 and opens dump valve 30. In other words, all of the branch circuits are returned to their initial positions except branch 11 which remains energized and indicates a large leak and branch 8.

Furthermore, if pressure initially opens contacts 20a of switch 20 but the contact again closes before a test is completed, due to a leak in the part being tested, the branch circuit 11 is energized to indicate a large leak. To this end, the branch circuit 3 is connected by a conductor 127a having a resistor R200 to the switch contact 21b of low pressure switch 21 and from the switch to the gate of silicon controlled rectifier Q11 by a conductor 127b. Thus, when Q3 fires to start a test period and switch 21b is closed, branch circuit 11 is energized to indicate a large leak.

If, after initiation of a test, the pressure of the testing fluid increases sufficiently to open the contact 20a of the switch 20 before the transistor T1 of the timing circuit 120 times out and fires, the branch circuit 11 will not become energized, which indicates that no large leak exists in the part 2 being tested. Contact 20b of the pressure switch 20 is normally connected across lines L1 and L2 through the resistance R16 on one side and capacitor C16 on the other side, and when actuated by the increase in pressure to engage its other contact it transmits an electric pulse from capacitor C16 through the line 129 to gate G of the silicon controlled rectifier Q2 in branch 2 to cause it to fire and light the lamp 36L indicating a stabilizing step. Current flow in branch 2 acts through a line 130 between branches 1 and 2 having a capacitor C1a which produces a bias on branch 1 and shuts off current flow therein and extinguishes lamp 35L. Firing of the rectifier Q2 also energized the RC network of timing circuit 121.

Simultaneously, contact 20b of the pressure switch 20 delivers an electric pulse through the line 128a to gate G of the silicon controlled rectifier Q5 to produce a flow of current to banch circuit 5. Branch circuit 5 is connected to the branch circuits 4 and 6 through capacitors C4 and C6 which produces a bias on the rectifiers Q4 and Q6 to shut off current flow in these branches. The interruption of current flow in branches 4 and 6 deenergizes the solenoid winding S19 to close the fill valve 19 and solenoid S30 to open the dump valve 30.

Pressure fluid then bleeds from the pressure testing system through the open dump valve 30 until the pressure falls to some lower pressure of, for example, 35 pounds per square inch at which time the contact 21a of the switch 21 is actuated. Switch 21 in its high pressure position is connected to the positive side of a power line through a resistance R17 to charge a capacitor C17. When the switch contact 21a is actuated to its lower pressure position, capacitor C17 delivers a pulse through the line conductor 131 to gate G of the silicon controlled rectifier Q6 in branch 6 including the solenoid S30 for the dump valve 30. Firing of the rectifier Q6 energizes the solenoid S30 to again close the dump valve 30.

A predetermined time period after the dump valve 30 has closed and the fluid pressure has become stabilized throughout the system, the RC network of the stabilizing branch 121 will produce a voltage on the emitter E of the transistor T2 which will cause it to fire. Firing of the transistor T2 produces a current flow through the line conductor 132 and test switch 132a therein to the gate G of the silicon controlled rectifier Q3 in branch 3 to cause it to fire and conduct current through the lamp 37L indicating that a testing step has been initiated. Firing of the rectifier Q3 first sends a pulse through the line 133 to the condenser C2a to put a bias on the rectifier Q2 and stop current flow through the lamp 36L. Firing of rectifier Q3 also energizes the RC network of the timing circuit 122. Firing of the rectifier Q3 also delivers a pulse through line 134 to the gate G of rectifier Q7 causing it to fire and conduct current through branch 7 including the solenoid S29 of normally open divide valve 29, see FIGURE 2. Closing of divide valve 29 then segregates the ballast tank 25 and chamber 27 of the testing element 24 from the remainder of the pneumatic testing system so that the opposite chamber 26 of the testing element is connected to the cavity in the part 2 being tested. Firing of the rectifier Q3 also directs current through the branch line 134a and resistance R14f to energize the sensing circuit including the transistor T14.

Any deflection of the diaphragm 28 of the measuring device 24 resulting from a small leak in the part being tested produces a voltage in the cathode follower 107 and thereby produces a difference in potential between the lines 116 and 117 which is impressed on the emitter E14 of the transistor T14. When this potential rises to a predetermined value for which it is set the transistor T14 fires and produces a current flow through the line 135 to the gate G of the silicon controlled rectifier Q12 to cause it to fire. Firing of the rectifier Q12 produces a current flow through the branch 12 including the lamp 39L to indicate that a small leak exists. Branch circuit 12 has a resistance R12b between the rectifier and side L1 of the line and parallel line is connected through a diode D12a to the conductor 128. A pulse is then transmitted through line 128 to gate G of rectifier Q8 in branch 8 and acting through the capacitor C9 shuts off the current flow through branch 9 and thereby disconnects the extension L2a from line L2. De-energization of line L2a returns all of the circuits 1 to 7 and instrumentalities actuated thereby to their initial position.

If no leak exists in the part being tested, no current is produced in the sensing circuit, so that no pulse is transmitted to the emitter of the transistor T14 in the testing circuit sufficient to cause it to fire. When the transistor T3 in the RC timing circuit 122 fires, a pulse is transmitted through the line conductor 136 to the gate G of the rectifier Q13 in the branch circuit 13. Rectifier Q13 then fires conducting current through the lamp 40L indicating no leak in the part 2 being tested. Branch circuit 13 includes a resistance R13b between the rectifier and opposite side of the line L1 and a resistance R13a between it and the gate G and the cathode in line 128, as later described in detail, for firing the rectifier Q8 in branch 8 to interrupt current flow from the line L2 to extension L2a, as perviously described, to terminate the testing operation. All of the branches Q1 to Q7 are then de-energized and the elements controlled thereby are returned to their initial position. Upon de-energization of the branches 6 and 7, the dump valve 30 and divide valve 29 open to reduce the pressure in the fluid system to zero at which time the pressure switches 20 and 21 are returned to their initial position, illustrated in FIGURE 2. The only branch circuits which remain energized are the one indicating that the part has no leak and branch 8. The testing apparatus will remain in this condition until the next part to be tested is moved into the testing zone 3 to again actuate the switch 12 to initiate another test. As thus far described, the circuit is substantially the same as shown and described in the U.S. patent to Fitzpatrick, No. 3,326,034.

In accordance with the present invention, the electric circuit includes improvements which increase the stability and reliability of the leak testing system. The improvements comprise an arrangement for connecting the cathodes of the silicon control rectifiers Q11, Q12 and Q13 in the branch circuits 11, 12 and 13, respectively, to prevent more than one lamp 38L, 39L and 40L from being on at the same time, a circuit arrangement, for the starting switch 12, to prevent initiation of a new testing operation until the preceding testing operation has been completed, and a circuit arrangement for connecting the meter 41 to the sensing circuit only during a testing period to prevent any uncontrolled oscillation of the meter prior to testing.

The circuit arrangement for connecting the cathodes of responsive branch circuits 11, 12 and 13 comprises a common conductor 200 joined to each of the circuits branches 11, 12 and 13 between the rectifiers Q11, Q12 and Q13 and resistances R11b, R12b and R13b, respectively. The conductor 128 then connects the common conductor 200 to the branch circuit 8 which terminates a testing operation when energized. With this circuit arrangement the silicon controlled rectifier Q11, Q12 and Q13 which first fires and produces a current flow in a branch circuit 11, 12 or 13 will bias the remaining branch circuits to reduce the possibility of any stray or uncontrolled pulses applied to the gate from firing another of said rectifiers.

In addition, a capacitance C25 and a diode D25 are connected from the common conductor 200 in parallel with the resistances R11b, R12b and R13b to line L1. Another capacitance C26 is connected between the gate G and cathode of the silicon controlled rectifier Q8 in branch circuit 8 to fire 8 with a pulse at DC current level. The capacitances C25, C26 and diode D8 increase the stability of the branch circuits 11, 12 and 13.

The improved circuit arrangement also includes current control relays 202, 203 and 204 connected in parallel with the indicating lamps 38L, 39L and 40L, respectively, for controlling instrumentalities such as an ejecting mechanism, marking device, or the like. Connected in parallel with the control relays 202, 203 and 204 are diodes 205, 206 and 207, respectively, to prevent inductive current pulses from destroying rectifiers Q11, Q12, and Q13.

In the improved circuit arrangement, the starting switch 12 is connected in a relay circuit 210 across a voltage source and in series with a coil 211 of a control relay 212 having a single pole 212a and fixed contacts 212b and 212c.

Thus, when control switch 12 is closed the coil is energized to actuate the pole 212a from engagement with fixed contact 212b as illustrated in full lines in FIG. 4 into engagement with fixed contact 212c as illustrated in dotted lines in FIG. 4. Fixed contact 212b of the relay 212 is connected to the positive side of a line through a resistance 213 and the pole 212a is connected to the negative side of the line through a condenser 214 to store electric current in the condenser. When the relay 212 is actuated to the position shown in dotted lines the condenser 214 discharges a pulse of electric current through contact 212c and conductor 215 to the conductor 124 to energize the branch circuits 1, 4, 6, 9 and 10 as previously described. A second relay 216 is provided in the conductor 215 for opening the circuit from relay 212 as soon as a testing operation has been initiated. Relay 216 has a pole 216a normally closed on a fixed contact and is actuated to an open circuit position illustrated in dotted lines by relay coil 217. Relay coil 217 in turn, is connected at one end through conductors 218 and 219 to branch circuits 2 and 3, respectively, and at the opposite end to the negative side of L1 of the 24 volt DC source. Conductor 218 connects branch circuit 2 between the silicon controlled rectifier Q2 and the indicating lamp 36L through the diode D2a to coil 217 of relay 216, the conductor 219 connects to branch circuit 3 between the silicon controlled rectifier Q3 and the indicating lamp 37L through diode D3a to the relay coil. Thus, it will be seen that after the filling step has been completed and the testing cycle has not been terminated because of a large leak, the branch circuit 2 is energized, and acting through the conductor 218 or 219 energizes the coil 217 to move the relay contact 216a to open circuit position. Opening of relay contacts 216a and 216b thereby prevent switch 12 from transmitting a pulse or any other stray pulse from being transmitted to conductor 124 which would otherwise start a new testing cycle before the previous cycle had been completed.

Meter 41 is connected across lines 111 and 112 of the transducer through conductors 231 and 232. The conductor 231 is connected to one end of a resistance R31 and the opposite end of the resistance is connected to branch conductors 231a and 231b. Conductor 231a terminates at a movable contact 233a of a normally open testing switch 233 adapted to be closed manually and connected to one side of the meter 41 through a conductor 231c. Conductor 231b is connected to a fixed contact 234a of a normally open relay switch 234 having a movable contact 234b also connected through conductor 231c to the meter 41. Relay 234 has a coil 235 connected at one end through conductors 236 and 134 to the branch circuit 3. It will be observed that the meter branch circuit is normaly open until the silicon controlled rectifier Q3 fires to energize the branch circuit 3 and initiate a testing step. Such energization of the branch circuit 3 immediately energizes the relay coil 235 of relay 234 to connect the meter 41 across the lines 111 and 112. The operator may then observe any deflection of the meter needle indicating a leak. However, as soon as the test period terminates or the transistor T14 fires, the branch circuit 9 is de-energized to disconnect the branch circuit 3. The opening of the branch circuit 3 de-energizes the coil 235 of the relay 234 which drops contact 234b to the open circuit full line position illustrated and is ready for the next testing operation.

It will now be observed that the present invention provides an improved testing system which avoids multiple signals, provides greater circuit stability, and a testing circuit which is more reliable in operation than those previously known. It will further be observed that the present invention provides a circuit arrangement which prevents the system from recycling until a test cycle in operation has been completed. It will also be observed that the present invention provides an arrangement by which the meter is operative only while a testing step is being performed. It will still further be observed that the present invention provides a leak testing system which is of simple and compact construction, economical to manufacture, and one which is reliable in operation.

While a single embodiment of the invention is herein illustrated and described, it is to be understood that changes may be made in the circuit arrangement without departing from the spirit and scope of the invention.

We claim:

1. In an apparatus for testing parts for leaks of the type including instrumentalities to first subject the wall of a part to be tested to a testing fluid under pressure, to secondly stabilize said pressure and then thirdly to test the wall for leaks by means of an electric circuit having branches for initiating operation of the instrumentalities, successively, and timing the period of operation of each instrumentality, a sensing branch having a transducer for producing an electric current responsive to a leak, a plurality of branches in said circuit each having a solid state semiconductor and a responsive element for indicating a large leak, a small leak, and a no-leak condition and a branch for terminating a testing operation, the combination with said circuit of a common conductor connecting the cathodes of the solid state semiconductors in said plurality of branch circuits having a responsive element to said branch for terminating a testing operation whereby to oppose simultaneous energization of more than one of said plurality of said branches, a meter to indicate a pressure difference due to a leak, a normally open branch circuit energized to respond to a testing operation for connecting the meter to the sensing branch, a branch circuit having a starting switch for energizing the circuit to initiate a testing cycle, and switch means operable in response to energization of said circuit for disconnecting the starting switch from the testing circuit to prevent reenergization of the circuit until a testing operation is completed.

2. A leak testing apparatus comprising means forming a chamber at one side of a wall to be tested, means for delivering a fluid under pressure to said chamber, an electric circuit having means responsive to a pressure change for sensing a leak, a plurality of branches in said circuit and each branch having a solid semiconductor element and a responsive element for indicating a large leak, a small leak, and a no-leak condition, respectively, separate circuit branches responsive to a large leak, a small leak and a no-leak condition as sensed by said pressure responsive means and connected to render the semiconductor in a particular branch circuit conductive, and a common conductor connecting the cathodes of said solid state semiconductors in said plurality of branch circuits having the responsive elements to bias the semiconductors in the other branches and thereby oppose simultaneous energization of more than one of said branches.

3. A leak testing apparatus in accordance with claim 2 in which the solid state semiconductors are silicon controlled rectifiers.

4. A leak testing apparatus in accordance with claim 3 in which the circuit includes a branch for terminating a testing operation, said branch having a silicon controlled rectifier, said conductor connecting said plurality of branches being connected to energize said branch for terminating a testing operation, and a capacitance connected between the gate of the silicon controlled rectifier of said branch for terminating a testing operation and its cathode.

5. A leak testing apparatus in accordance with claim 2 in which the responsive elements in each of said plurality of said branch circuits comprises an indicating lamp and a relay connected in parallel.

6. A leak testing apparatus in accordance with claim 2 in which the branch circuits having responsive elements are connected in parallel across service lines at different potentials, said apparatus further comprising resistances between the common conductor and one of said lines, and a capacitance connected in parallel with the resistances between the common conductor and line to which the resistances are connected to increase the stability of the circuit.

7. A leak testing apparatus comprising means for forming a chamber on one side of a wall of a part to be tested for leaks, instrumentalities for delivering fluid under pressure to said chamber, stabilizing the pressure in said chamber and closing said chamber for a test, a measuring instrument responsive to a pressure change in said chamber for producing a current flow when the wall leaks, an electric circuit for controlling operation of said instrumentalities and their period of operation, successively, and having a testing branch for closing said chamber and for initiating a test period when energized, and means responsive to the energization of said branch for connecting said meter to said measuring instrument.

8. A leak testing apparatus in accordance with claim 7 in which the measuring instrument responsive to a pressure change in said chamber comprises a transducer for producing an electric current proportional to the size of a leak, said meter being connected across the terminals of said transducer, said means responsive to the energization of said branch comprising a relay having an actuating coil connected to said testing branch, and a manually operable test switch connected in parallel with said relay.

9. A leak testing apparatus comprising means for forming a chamber on one side of a wall of a part to be tested, means for delivering fluid under pressure to said chamber, an electric circuit having a plurality of operating branches with each branch having an instrumentality which performs one of the functions of supplying fluid under pressure to the chamber, stabilizing the pressure in said chamber, sensing any change in pressure, and operating responsive elements to indicate a leak or no-leak condition, said circuit having control branches for energizing said operating branches in successive, each of said operating and control branches having a solid state semiconductor therein, a starting switch for initially supplying an electric impulse to the solid state semiconductor in one of said branch circuits to initiate a testing operation, and a branch circuit for said starting switch having a relay including a normally closed switch and a coil for actuating said switch to open position when energized, and said coil of said relay being connected for energization by at least one of said branch circuits after a testing operation has been initiated to open the switch of said relay and the branch circuit for said starting switch to prevent initiation of a new testing operation until the previous testing operation has been completed.

10. A leak testing apparatus in accordance with claim 9 in which the relay is a single pole double throw switch, said apparatus further comprising a second branch circuit connecting said relay to a source of current and including a resistance and a condenser, said relay connecting the charged condenser to a control branch to initiate operation of said system to supply fluid, and a second relay in said second branch circuit having a normally open switch connected in series with the first mentioned relay switch and a coil for closing the switch when energized, and means for energizing said coil of said second relay.

References Cited

UNITED STATES PATENTS

| | | | |
|---|---|---|---|
| 3,154,772 | 10/1964 | Lindberg | 340—214 XR |
| 3,315,519 | 4/1967 | Ferguson | 73—40 |
| 3,326,034 | 6/1967 | Fitzpatrick et al. | 73—40 |
| 3,358,732 | 12/1967 | Stuart | 73—40 XR |

LOUIS R. PRINCE, Primary Examiner

JEFFREY NOLTON, Assistant Examiner

U.S. Cl. X.R.

73—45.2; 340—242, 309.1, 411